United States Patent [19]
Cody et al.

[11] Patent Number: 5,336,372
[45] Date of Patent: * Aug. 9, 1994

[54] PROCESS FOR DEINKING WASTEPAPER UTILIZING ORGANOCLAYS FORMED IN SITU

[75] Inventors: Charles A. Cody, Robbinsville; Edward D. Magauran, Mt. Holly, both of N.J.

[73] Assignee: Rheox, Inc., Hightstown, N.J.

[*] Notice: The portion of the term of this patent subsequent to Sep. 29, 2009 has been disclaimed.

[21] Appl. No.: 944,624

[22] Filed: Sep. 14, 1992

Related U.S. Application Data

[63] Continuation-in-part of Ser. No. 697,448, May 9, 1991, Pat. No. 5,151,155.

[51] Int. Cl.⁵ .................................. D21F 5/02
[52] U.S. Cl. ................................. 162/5; 162/8
[58] Field of Search ............. 162/8, 199, DIG. 4, 162/5

[56] References Cited

U.S. PATENT DOCUMENTS

| | | | |
|---|---|---|---|
| 1,421,195 | 6/1922 | Eyrich et al. | 162/8 |
| 1,659,401 | 2/1928 | Kirschbraun | 162/5 |
| 3,801,433 | 4/1974 | Windle | 162/DIG. 4 |
| 4,013,505 | 3/1977 | Balcar | 162/5 |
| 4,305,781 | 12/1981 | Langley et al. | 162/164 R |
| 4,710,267 | 12/1987 | Elsby et al. | 162/8 |
| 4,816,164 | 3/1989 | Presley | 210/710 |
| 4,867,844 | 9/1989 | Dessauer | 162/135 |
| 4,935,096 | 6/1990 | Gallagher et al. | 162/5 |
| 5,094,716 | 3/1992 | Letscher | 162/7 |

FOREIGN PATENT DOCUMENTS

| | | |
|---|---|---|
| 4007596 | 9/1991 | Fed. Rep. of Germany . |
| 1006190 | 1/1989 | Japan . |
| 4202879 | 7/1992 | Japan . |

*Primary Examiner*—Karen M. Hastings
*Attorney, Agent, or Firm*—Michael J. Cronin

[57] ABSTRACT

A process for deinking wastepaper, which comprises: (a) forming an organoclay deinking agent in an aqueous system; (b) contacting ink from wastepaper in the aqueous system with an amount of the organoclay deinking agent effective to deink the wastepaper; and (c) recovering deinked paper pulp from the aqueous system.

38 Claims, No Drawings

PROCESS FOR DEINKING WASTEPAPER UTILIZING ORGANOCLAYS FORMED IN SITU

CROSS REFERENCE TO RELATED APPLICATION

This application is a continuation-in-part of U.S. patent application Ser. No. 07/697,448, filed May 9, 1991, now U.S. Pat. No. 5,151,15 the entire disclosure of which is incorporated herein by reference.

BACKGROUND OF THE INVENTION
1. Field of the Invention

The present invention relates to a process for removing ink from wastepaper in order to provide paper pulp that may be reused to manufacture new paper-based products. In particular, the invention is directed to a process for removing both water-based and oil-based inks from wastepaper by means of a novel group of deinking agents.

2. Description of the Prior Art

Recycled wastepaper has traditionally been a source of raw fiber materials needed in the papermaking industry. In the past, fiber from wastepaper was only employed in the production of low grade paper and paperboard products. Today, however, reclaimed fiber comprises about 25 percent of the total fiber used to manufacture paper, thereby providing an incentive for improving the utility of reclaimed paper pulp materials. In particular, recent efforts have attempted to develop techniques for effectively removing ink from waste fibers, in order to permit their use in the manufacture of high quality paper.

In conventional paper reclamation processes, deinking is carried out by converting the wastepaper to a pulp and contacting the pulp with an alkaline aqueous deinking medium containing a chemical deinking agent, in order to remove ink and other impurities from the pulp fiber and produce a suspension or dispersion of the ink and other particles in the aqueous medium. The resulting mixture is subsequently treated to separate the suspended ink and other particles from the pulp, for example, by air sparging and floatation of the ink/deinking agent complex, followed by skimming to remove the ink and other particles from the treatment bath, or by filtration and subsequent water washing of the fiber mat to remove dispersed ink particles.

There have been numerous attempts in the prior art to improve the efficacy of conventional deinking processes. For example, U.S. Pat. No. 4,618,400 discloses a method for deinking wastepaper which involves converting the wastepaper to a pulp; contacting the pulp with an aqueous medium of alkaline pH containing about 0.2 to 2% by weight of a deinking agent which is one or a mixture of certain thiol ethoxylate compounds; and removing suspended or dispersed ink from the pulp-containing medium.

U.S. Pat. No. 4,666,558 illustrates a deinking process for waste newsprint, which involves contacting and agitating a pulped newsprint in an aqueous medium containing a deinking agent comprising a particular mixture of a water-soluble $C_9$ to $C_{16}$ alkanol ethoxylate component and an oil-soluble $C_9$ to $C16$ alkanol ethoxylate component, and recovering deinked pulp from the aqueous medium.

U.S. Pat. No. 3,932,206 describes deinking agents which are said to be non-toxic to aquatic life; the disclosed compounds consist of ethoxylated aliphatic mono-or diols.

Japanese Patent Publication 59-150191 discloses a process for deinking wastepaper by macerating the paper in the presence of a fatty acid salt, and then subjecting the paper to a quaternary ammonium surfactant.

Soviet Union Patent 926129 provides a composition for removing printing ink from wastepapers, which contains quaternary ammonium and phosphonium surfactants, isoamyl alcohol, phosphine oxide, butyl xanthogenate, and solvent.

U.S. Pat. No. 4,867,844 discloses a method of treating fibrous materials, by applying an organophilic complex formed from a clay (preferably bentonite) and an organic radical derived from an onium compound (preferably quaternary ammonium compound).

Japanese Patent Publication JP3119189 discloses a method of removing fibrous contaminates from the white water resulting from paper making by separately adding clay and a cation-surface-active bonding agent. The bonding agent disclosed is stearyl-trimethyl ammonium chloride.

Despite the foregoing efforts, it is generally agreed that no completely acceptable process for deinking wastepaper presently exists. One shortcoming of many of the prior art deinking techniques is the inability of these processes to simultaneously remove both water-based and oil-based inks from the wastepaper. The removal of water-based (flexographic) inks from wastepaper has proved to be a particularly troublesome problem associated with known flotation deinking processes. For example, standard fatty acid soap chemistry cannot collect the highly dispersed water-based ink waste. The removal of water-based inks from wastepaper using washing deinking processes also presents problems because of the use of large volumes of water and the need to treat the water so that the water can be recycled. In this regard, substantial costs are associated with processing wastepaper materials to separate water-based ink containing materials from those which contain oil-based inks.

Moreover, deinking agents utilized to date have been ineffective in removing tacky contaminants from wastepaper. These tacky contaminants (from pressure sensitive labels, binding materials and glues) are frequently encountered in wastepaper deinking processes, and tend to limit the quality of the final recycled product.

It would therefore be highly desirable to provide a process for deinking various types of wastepaper which contain water-based and/or oil-based inks. In addition, it would be advantageous if such a deinking process could also remove tacky contaminants from the treated wastepaper, in order to enhance the quality of deinked paper pulp yielded by the process.

SUMMARY OF THE INVENTION

The present invention is based upon the discovery that organoclays function as highly effective deinking agents, and further that such organoclay deinking agents may be conveniently formed in situ in an aqueous system during a deinking operation. Further, organoclays are effective in eliminating sticky components associated with pressure-sensitive labels and adhesives used in bookbindings. Thus, the present invention provides a process for deinking wastepaper, which comprises: (a) forming an organoclay deinking agent in an aqueous system; (b) contacting ink from wastepaper in the aqueous system with an amount of the organoclay deinking agent effective to deink the wastepaper; and (c) recovering deinked paper pulp from the aqueous system.

The invention contemplates five means for forming the organoclay deinking agent in situ in the aqueous system. First, the organoclay may be formed in the aqueous system by adding one or more ammonium salts and one or more cation-exchangeable clays to the aqueous system, where these materials react to form the organoclay deinking agent.

Alternatively, if some or all of the wastepaper to be treated contains cation-exchangeable clays, the organoclay deinking agent may be formed in the system by (a) pulping wastepaper some or all of which contains cation-exchangeable clay, to release the clay from the wastepaper; and (b) mixing at least one ammonium salt to form a deinking agent.

A third technique involves adding an anhydrous blend, composed of one or more cation exchangeable clays mixed with one or more ammonium salts, to the aqueous system. When without water, the clay does not react with the ammonium salt. Upon addition of the blend to the aqueous system, the clay reacts with the salt to form an organoclay deinking agent. In addition the ammonium salt may also react with any clay contained in the wastepaper.

A fourth means is where both a cation-exchangeable clay and one or more ammonium salts are present in the wastepaper to be deinked. The ammonium salt(s) may be added to the ink, paper sizing, or paper itself before the paper is printed. Then, a pulping step liberates both the ammonium salt(s) and the clay contained in the wastepaper, so that they react in situ to form an organoclay.

A fifth technique involves adding the ammonium salt(s) to the ink, paper sizing, or paper itself before the paper is printed, pulping the wastepaper to liberate the ammonium salt(s), and separately adding a clay, so that the clay and ammonium salt(s) react to form the deinking agent.

For all five means for forming the organoclay deinking agent in situ, additional amounts of clays or salts may be added to the aqueous system to enhance formation of sufficient organoclay to effectively deink the wastepaper.

The deinking process of the invention successfully removes both water-based (flexographic) and oil-based inks. The ability to collect and float flexographic ink and remove sticky components is a notable advantage of the invention over conventional deinking techniques.

DESCRIPTION OF THE PREFERRED EMBODIMENTS

According to the present invention, Applicants provide a process for deinking wastepaper, which comprises:
(a) forming an organoclay deinking agent in an aqueous system;
(b) contacting ink from wastepaper in the aqueous system with an amount of the organoclay deinking agent effective to deink the wastepaper; and (c) recovering deinked paper pulp from the aqueous system.

Applicants have discovered that the organoclay deinking agent may be formed in situ in the aqueous system by adding one or more ammonium salts and one or more cation-exchangeable clays to the aqueous system. Cation-exchangeable clays are clays that contain at least 5 m.e.q. of exchangeable monovalent or divalent cations, such as $Na^+$, $Li^+H^+Ca^{2+}Mg^{2+}$ or $Fe^{2+}$ per 100 grams of clay. Optionally, the monovalent or divalent cations can be replaced with organic cations such as ammonium salts. Examples of cation-exchangeable clays include, but are not limited to, hectorite, bentonite, saponite, attapulgite and kaolinite. The selection of a hydrophobic organic cation will result in organoclay that becomes hydrophobic after the ion exchange reaction. By selecting a hydrophilic organic cation, after ion exchanging the clay with the organic cation, a hydrophilic organoclay results. A hydrophobic organoclay is an organoclay that can be removed from water by air sparging the organoclay/water mix then sweeping or vacuum suctioning the organoclay from the surface.

Cation-exchangeable clays are commonly employed in paper compositions to provide a smoother surface, control the penetration of inks, and improve the pick resistance, appearance, brightness, and opacity of papers. Cation-exchangeable clays are also applied as functional coatings, to provide such features as water resistance and pressure sensitivity for carbonless copying. Thus, with regard to wastepapers which contain cation-exchangeable clays, it has been discovered that an organoclay deinking agent may be formed in situ in an aqueous system by (a) pulping a wastepaper containing a cation-exchangeable clay in the aqueous system, to release the cation-exchangeable clay from the wastepaper; and (b) mixing at least one ammonium salt with the aqueous system to form an organoclay deinking agent.

Under this second method, additional amounts of a cation-exchangeable clay may be added to the aqueous system if needed to provide effective deinking of the wastepaper.

Under the third through fifth methods, one or more ammonium salts present in the ink, paper, amhydrous blend, or paper itself is liberated during pulping and reacted in situ with cation-exchangeable clay, either liberated from the wastepaper or added separately, to form an organoclay deinking additive.

The deinking processes of the invention are preferably carried out in the presence of a surfactant, particularly when recovery of the deinked paper pulp is accomplished by floatetlon techniques. Polyoxyethylene type surfactants have been found to be particularly useful to modify the foaming characteristics of the organoclay deinking agent, and to enhance floatation of collected waste ink to the surface of the floatation cell. Polyoxyethylene 100 stearyl ether type surfactants, such as BriJ 700 (ICI Americas, Inc.), are particularly preferred.

Useful ammonium salts for purposes of the subject invention include those having the formula:

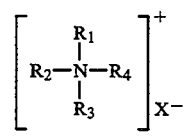

wherein $R_1$ comprises a lineal or branched altphatic hydrocarbon group having from 1 to about 30 carbon atoms; $R_2$, $R_3$ and $R_4$ are independently selected from the group consisting of (a) lineal or branched aliphatic groups having from 1 to about 30 carbon atoms; (b) aromatic and substituted aromatic groups; (c) ethoxylated groups containing from 1 to about 80 moles of ethylene oxide; and (d) hydrogen. The anion X⁻ which accompanies the ammonium salt is typically one that will not adversely affect the ability to cation exchange the clay with the ammonium salt. Such anions include, for example, chloride, bromide, iodide, hydroxyl, nitrite and acetate, used in an amount sufficient to satisfy the ammonium cation's charge.

The aliphatic groups in the above formula may be derived from naturally occurring oils including various vegetable oils, such as corn oil, coconut oil, soybean oil, cottonseed oil, castor oil and the like, as well as various animal oils or fats such as tallow oil. The aliphatic groups may likewise be petrochemically derived from, for example, alpha olefins.

Representative examples of useful branched, saturated radicals include 12-methylstearyl and 12-ethylstearyl. Representative examples of useful branched, unsaturated radicals include 12-methyloleyl and 12-ethyloleyl. Representative examples of unbranched, saturated radicals include lauryl; stearyl; tridecyl; myristyl (tetradecyl); pentadecyl; hexadecyl; hydrogenated tallow, docosanyl. Representative examples of unbranched, unsaturated and unsubstituted radicals include oleyl, linoleyl, linolenyl, soya and tallow.

Additional examples of useful aromatic groups, that is benzyl and substituted benzyl moieties, include materials derived from, e.g., benzyl halides, benzhydryl halides, trityl halides α-halo-α-phenylalkanes wherein the alkyl chain has from 1 to 22 carbon atoms, such as 1-halo-1-phenylethane, 1- halo-1-phenylpropane, and 1-halo-1-phenyloctadecane; substituted benzyl moieties, such as those derived from ortho-, meta- and para-chlorobenzyl halides, paramethoxybenzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as those derived from 2-halomethylnaphthalene, 9-halomethylanthracene and 9-halomethylphenathrene, wherein the halo group comprises chloro, bromo, iodo, or any other such group which serves as a leaving group in the nucleophilic attack of the benzyl type moiety such that the nucleophile replaces the leaving group on the benzyl type moiety.

Additional useful aromatic-type substituents include phenyl and substituted phenyl, N-alkyl and N,N-dialkyl anilines, wherein the alkyl groups contain between 1 and 22 carbon atoms; ortho-, recta- and para-nitrophenyl, ortho-, meta- and para-alkyl phenyl, wherein the alkyl group contains between 1 and 22 carbon atoms, 2-, 3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as phenol, or aralkyl such as benzyl alcohols; and fused ring aryl moieties such as naphthalene, anthracene, and phenanthrene.

Useful ammonium salts for purposes of the instant invention include hydrophobic ammonium salts, such as monomethyl trialkyl quaternaries and dimethyl dialkyl quaternaries, as well as hydrophilic ammonium salts, such as water-dispersible, ethoxylated ammonium compounds, and mixtures thereof.

In particular, a preferred hydrophilic ammonium salt for use in the deinking formulations of the invention for use in water washing deinking processes comprises an ethoxylated quaternary ammonium salt that contains:

(a) at least one hydrocarbon chain having from about 8 to about 30 carbon atoms; and (b) at least one hydrophilic carbon chain having greater than about 9 moles of ethylene oxide.

Examples of suitable ethoxylated quaternary ammonium compounds include the following:

Dihydrogenated tallow-methyl-[ethoxylated (33)] ammonium chloride:

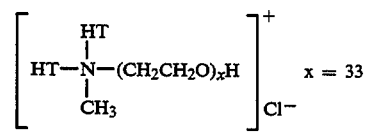

Hydrogenated tallow-methyl-[ethoxylated (15)] ammonium chloride:

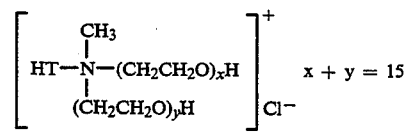

Hydrogenated tallow-methyl-[ethoxylated (30)] ammonium chloride:

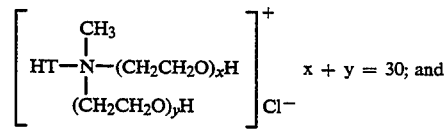

Hydrogenated tallow-methyl-[ethoxylated (50)] ammonium chloride:

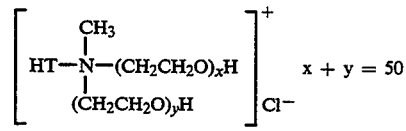

wherein HT = hydrogenated tallow.

A preferred hydrophobic ammonium salt for use in the deinking formulations of the invention, particularly for floatation deinking processes, comprises a quaternary ammonium salt that contains:

(a) at least one, preferably two or three, hydrocarbon chains having from about 8 to 30 carbon atoms; and (b) either no hydrophilic carbon chains or having hydrophilic carbon chains having a total of about 9 moles of ethylene oxide or less.

Examples of suitable hydrophobic ammonium salts include the following:

Methyl trihydrogenated tallow ammonium chloride:

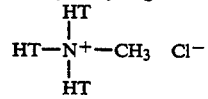

Dihydrogenated tallow-methyl-[ethoxylated (2)] ammonium chloride:

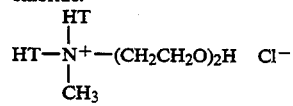

Dimethyl dihydrogenated tallow ammonium chloride:

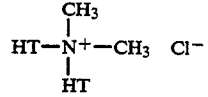

Dimethyl dibehenyl ammonium chloride:

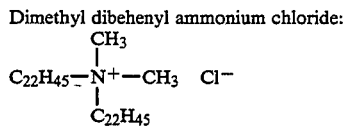

wherein HT = hydrogenated tallow.

Other preferred ammonium salts for use in the invention include benzyl methyl dihydrogenated tallow ammonium chloride, dihydroxTethylisoarchidaloxTpropyl ammonium chloride (TOMAH), and dimethyl dicoco ammonium chloride.

It should be understood that either a mixture of hydrophobic organoclay and hydrophilic organoclay, or an organoclay in which the ammonium salt provides the resultant organoclay with the proper hydrophilic/hydrophobic balance, could be employed in deinking processes that employ a combination of floatation and water washing techniques to produce deinked pulp. Thus, an crganoclay made from two different ammonium salts varying in their hydrophobic properties would be within the teachings of the invention. In this regard, ammonium salts having both hydrophobic and hydrophilic groups may be employed. Further, a mixture of cation-exchangeable clays having different cation exchange capacities may also be used to form the organoclay for deinking.

The preparation of the ammonium compounds utilized in the inventive deinking formulations can be carried out by techniques well-known in the art. For example, when preparing a quaternary ammonium salt, one skilled in the art would prepare a dialkyl secondary amine, for example, by the hydrogenation of nitriles (see U.S. Pat. No. 2,355,356), and then form the methyl dialkyl tertiary amine by reductive alkylations using formaldehyde as a source of the methyl radical. According to procedures set forth in U.S. Pat. No. 3,136,819 and U.S. Pat. No. 2,775,617, a quaternary amine halide may then be formed by adding benzyl chloride or benzyl bromide to the tertiary amine. The disclosure of the above three patents are incorporated herein by reference.

As is well-known in the art, the reaction of the tertiary amine with benzyl chloride or benzyl bromide may be completed by adding a minor amount of methylene chloride to the reaction mixture so that a blend of products which are predominantly benzyl substituted is obtained. This blend may then be used without further separation of components.

The clays which may be used in the present invention are cation-exchangeable clays having a cationic exchange capacity of at least about 5 milliequivalents per 100 grams of clay, as determined by the well-known methylene blue and ammonium acetate methods.

Cation-exchangeable clays are well-known in the art and are commercially available from a variety of sources. They may be used in the crude form, containing gangue and non-clay species, or purified by any of the well-known processes. Prior to use in the deinking formulations of the invention, the clays may also be converted to the sodium form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder. Conversion of the clay to the sodium form can be undertaken at any point before formation of the organoclay deinking agent.

Cation exchangeable clays prepared synthetically by either a pneumatolytic or, preferably, a hydrothermal synthesis process may also be used to prepare the novel deinking agents of the invention.

Representative cation-exchangeable clays useful in accordance with the present invention are the following:

Montmorillonite

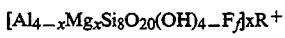

where $0.55 \leq x \leq 1.10, f \leq 4$ and R is selected from the group consisting of Na, Li, NH$_4$, and mixtures thereof;

Bentonire

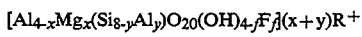

where $0 < x < 1.10$, $0 < y < 1.10$, $0.55 \leq (x+y) \leq 1.10$, $f \leq 4$ and R is selected from the group consisting of Na, Li, NH$_4$ and mixtures thereof;

Kaolinitc

Attapulgite

Beidellite

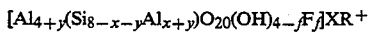

where $0.55 \leq x \leq 1.10$, $0 \leq y \leq 0.44$, $f \leq 4$ and R is selected from the group consisting of Na, Li, NH$_4$ and mixtures thereof;

Hectorite

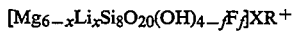

where $0.57 \leq x \leq 1.15$, $f \leq 4$ and R is selected from the group consisting of Na, Li, NH$_4$, and mixtures thereof;

Saponite

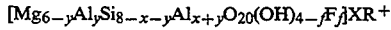

where $0.58 \leq x \leq 1.18$, $0 \leq y \leq 0.66$, $f \leq 4$ and R is selected from the group consisting of Na, Li, NH$_4$, and mixtures thereof; and Stevensite

where $0.28 \leq x \leq 0.57$, $f = 4$ and R is selected from the group consisting of Na, Li, NH$_4$, and mixtures thereof.

The preferred clays utilized in the present invention are bentonitc and hectoritc. It will be understood that both sheared and non-sheared forms of the above-listed cation-exchangeable clays may be employed. In addition, the cation-exchangeable clay employed can be either crude (containing gangue or non-clay material) or beneficiated (gangue removed). The ability to use crude clay in the cation-exchangeable clay containing deinking compositions of this invention represents a substantial cost savings, since the clay beneficiation process and conversion to the sodium form do not have to be carried out.

The cation-exchangeable clays may be synthesized hydrothermally by forming an aqueous reaction mixture in the form of a slurry containing mixed hydrous oxides or hydroxides of the desired metals with or without sodium (or alternate exchangeable cation or mixture thereof) in the proportions defined by the above formulas and the preselected values of x, y and f for the particular synthetic cation-exchangeable clay desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C. depending upon the particular cation-exchangeable clay being synthesized; the optimum time can be readily determined by pilot trials.

The deinking process provided by the invention may utilize either or both hydrophilic and hydrophobic organoclays as wastepaper deinking agents. Typically, relatively hydrophilic organoclays will find their greater utility in deinking systems which employ water washing to remove ink. Relatively hydrophobic organoclays will find their greatest utility in systems that employ floatation.

The deinking agent can be prepared, for example, by admixing for reaction a cation-exchangeable clay, ammonium salt(s), and water together in the aqueous system, preferably at temperatures in the range of from about 0.01° C. to 100° C. The reaction results in an organoclay deinking agent which deinks the wastepaper. The organoclay either deinks the wastepaper by contacting ink in the wastepaper, or by contacting ink which has been released into the system as a result of pulping or by other agents, such as sodium hydroxide.

An advantage of the in situ formation of the deinking agent over use of a preformed organoclay is that it does not have to be filtered, washed, dried, or ground prior to addition. Also, the organoclay is formed in a highly dispersed state, which aids deinking efficiency, and allows the use of ammonium salt/cation exchangeable clay combinations that cannot be readily dispersed in the pulping unit. Thus, the in situ method allows for a broader range of ammonium salts and cation exchangeable clays to be employed, along with cost savings due to lower raw material prices.

When clay is added to the system to be deinked, the clay can be added in dry or predispersed form. Optionally, the water/clay slurry may be centrifuged before addition to remove impurities. The slurry may also be sheared before addition, to increase the efficiency of the in situ formed organoclay.

A preferred organoclay aleinking agent comprises the reaction product of:

(a) a cation-exchangeable clay having a cation exchange capacity of at least about 5 milliequivalents per 100 grams of clay; and (b) one or more ammonium salts in an amount of from about 20% to about 350% of the cation exchange capacity of the cation-exchangeable clay.

The aleinking agents employed in the process of the invention are used in amounts of from about 0.05% to about 50% by weight, based on the dry weight of the wastepaper treated.

The recovery of deinked paper pulp according to the process of the invention is preferably achieved by either floatation and/or water washing techniques well-known in the art. When the inventive technique is carried out as a floatation process, the deinking agents flocculate the ink released from the wastepaper, followed by air floatation and skimming of the ink, deinking agent and tacky contaminants to remove the same from the aqueous slurry. The operation is preferably carried out under alkaline conditions. The aqueous system may include one or more foaming agents, such as soaps, or detergents, and surfactants, in order to yield enchanced deinking performance.

When the inventive technique is carried out as a water washing process, the slurry is optionally treated to physically remove the relatively small amount of foamy ink waste which may collect on the surface, then filtered and the resulting fiber mat subjected to multiple water washings so that dispersed ink particles pass through the mat. The deinking agents function to disperse the ink particles to a size small enough so that on filtration the ink particles, deinking agent, and tacky contaminants can be removed by rinsing through the fiber mat. The operation is again preferably carried out under alkaline conditions.

The process of the invention is effective for deinking wastepaper containing both water-based and oil-based inks. Exemplary types of wastepapers which may be treated according to the invention are newspaper, magazines, computer paper, legal documents, book stock, and mixtures of these materials.

The wastepaper is pulped in order to increase the surface area of the wastepaper in contact with the deinking agents of the invention. Further, as discussed above, pulping of wastepapers containing cation-exchangeable clays has been found to release the clays into the aqueous system, where the clays may then react with an ammonium salt to form an organoclay deinking agent. Similarly, the deinking agent may be formed in situ by pulping wastepaper containing both a cation-exchangeable clay and an ammonium salt, or by pulping a wastepaper containing an ammonium salt and separately adding a cation-exchangeable clay to the aqueous system. Techniques and apparatus for pulping wastepaper are well-known to those having ordinary skill in the art. For example, the wastepaper may be pulped after addition to the aqueous system by subjecting the system to shear.

The process of the invention provides an effective means for deinking wastepaper containing water-based and/or oil-based inks. The inventive process results in deinked paper pulp that is suitable for the manufacture of high quality recycled paper products. In addition, the deinked paper pulp yielded by the invention contains fewer tacky contaminants than the products of conventional deinking techniques.

The following examples are given to illustrate the invention, but are not deemed to be limiting thereof. All percentages given throughout the specification are based upon weight, 100% weight basis, unless otherwise indicated.

EXAMPLE 1

This example describes the preparation of a preferred organoclay deinking composition according to the invention for use in a floatation deinking process, based on a reaction product of cation-exchangeable clay and ammonium salt.

366.3 grams of a 5.46% solids crude hectorite clay (cation exchange capacity 55 m.e./100 g crude clay solids) slurry (20 grams of crude clay solids) sheared using a Tekmar SD-45 disperser was weighed into a 1.2 liter stainless steel reaction vessel, diluted with 150.0 grams of water and heated to 65° C. 70 milliequivalents (8.82 grams) of 91.7% active dimethyl dihydrogenated tallow ammonium chloride was melted and poured into the clay slurry. 65.1 grams of hot water was employed to rinse the ammonium salt into the clay slurry. The resulting mixture was stirred for 30 minutes at 65° C., cooled, sheared for 10 seconds to break up agglomerates and analyzed for percent solids. Percent solids was found to be equal 5.1%.

EXAMPLE 2

This example describes the floatation deinking procedure followed for evaluating the effectiveness of the deinking agent prepared in Example 1, and those of Examples 3–7 below, in deinking waste newsprint to yield recycled paper of enhanced brightness.

5.6 grams of newspaper (Trentonjan), cut into small (~$\frac{1}{2}$ square inch) pieces, was added to 500 milliliters of water heated to 45° C. and adjusted to a pH of 9.5 with 1.0 milliliter of 10% sodium hydroxide solution. The aqueous slurry of newspaper was allowed to mix under low agitation for 10 minutes. The waste newspaper was then defibered by mixing for 3 minutes using a Cowles high speed dispersator at 2500 rpm. A portion of the organoclay slurry deinking agent prepared in Example 1 containing 1.5 grams of organoclay solids was then added to the defibered newspaper and thoroughly mixed. The defibered newspaper/organoclay mixture was then subjected to air sparging in order to float the flocculated ink waste. A floating ink floc was produced; it was removed by suction.

After air sparging and removal of the floated floc for a period of 10 minutes, the deinked paper pulp was recovered and acidified to a pH of 4.5 with sulfuric acid. The deinked paper pulp was then vacuum filtered and deposited onto a plastic sheet, covered with two filter paper blotters, onto which another plastic sheet was placed. The paper pulp was subjected to a pressure of 1 ton in a press for 90 seconds. The pressed sheet was removed from the press; the filter paper blotters were removed, and the pressed sheet was allowed to air dry overnight. After drying, the pressed sheet was tested using a Hunterlab Model D-25 Optical Sensor to measure blue reflectance, which was employed as an indicator of paper brightness.

EXAMPLE 3

The organoclay deinking agent described in Example 1 was evaluated according to the floatation deinking procedure described in Example 2. For comparison, a Blank was also run. For the Blank, the procedure described in Example 2 was followed, except that no organoclay deinking agent was added. Data are presented below.

| Sample | Brightness Value | Δ |
|---|---|---|
| Blank - No Deinking Agent | 52.75 | — |
| Example 1 | 60.13 | 7.38 |

Data indicate that employing an organoclay of this invention as a deinking agent in a floatation deinking process yields recycled paper of considerably greater brightness than that obtained for the Blank.

EXAMPLE 4

This example describes the preparation of a preferred organoclay floatation deinking agent composed of an ethoxylated ammonium salt reacted with cation-exchangeable clay.

366.3 grams of 5.46% solids crude hectorire clay slurry (20 grams of crude clay solids) sheared using a Tekmar SD-45 disperser was weighed into a 1.2 liter stainless steel reaction vessel, diluted with 150.0 grams of water and heated to 65° C. 55 milliequivalents (12.33 grams) of 76.5% active methyl dihydrogenated tallow [ethoxylated (7) ]ammonium chloride was melted and poured into the clay slurry. 65.1 grams of hot water was used to rinse the ammonium salt into the clay slurry. The mixture was stirred for 30 minutes at 65° C. cooled sheared for 10 seconds to break up agglomerates and analyzed for percent solids. Percent solids was determined to be 5.40%.

EXAMPLE 5

The organoclay deinking agent prepared in Example 4 was evaluated according to the floatation deinking procedure described in Example 2. Brightness data obtained versus the Blank are presented below.

| Sample | Brightness Value | Δ |
|---|---|---|
| Blank - No Deinking Agent | 52.80 | — |
| Example 4 | 59.40 | 6.60 |

Data indicate greater recycled paper brightness compared to the Blank for organoclay deinking agents of this invention employed in a floatation deinking process.

EXAMPLE 6

This example describes the preparation of a preferred organoclay floatation deinking composition based on a reaction product of cation-exchangeable clay and an ammonium salt.

740.7 grams of 2.70% solids beneficiated bentonite clay slurry (20 grams clay solids) sheared one pass at 4500 psi using a Manton-Gaulin model 15MR homogenizer was weighed into a 3 liter stainless steel vessel and heated to 65° C. 150 milliequivalents (18.90 grams) of 91.7% active dimethyl dihydrogenated tallow ammonium chloride was melted and poured into the clay slurry. 50 grams of hot water was used to rinse the ammonium salt into the clay slurry. The mixture was stirred for 30 minutes at 65° C. cooled, sheared for 10 seconds to break up agglomerates and analyzed for percent solids. Percent solids was found to equal 4.77%.

EXAMPLE 7

The organoclay described in Example 6 was evaluated according to the floatation deinking procedure described in Example 2. Brightness data obtained versus the Blank are presented below.

| Sample | Brightness Value | Δ |
| --- | --- | --- |
| Blank - No Deinking Agent | 53.89 | — |
| Example 6 | 62.28 | 8.39 |

This example demonstrates that enhanced paper brightness can be achieved when a waste newspaper is treated with an organoclay floatation deinking agent of this invention based on cation-exchangeable clay that has been sheared.

EXAMPLE 8

This example describes the preparation of a series of water-dispersible organoclay deinking agents composed of octadecyl-methyl-[ethoxylated (15) ]ammonium chloride reacted with crude hectorite clay (~55% clay, 45% gangue) in which the milliequivalents of ammonium salt were varied.

356.5 grams of a 5.61% solids crude hectorite clay slurry (20 grams crude clay solids) sheared using a Tekmar SD-45 disperser was weighed into a 1.2 liter stainless steel reaction vessel, diluted with 164.9 grams of water and heated to 65° C. The following milliequivalents of 97% active octadecyl-methyl-[ethoxylated (15)]ammonium chloride were heated and poured into charges of crude clay slurry: (a) 40 m.e. (8.19 g), (b)55 m.e. (11.26 g), (c)70 m.e. (14.34 g), (d) 85 m.e. (17.41 g) and (e) 100 m.e. (20.48 g). 50 milliliters of hot water was used to rinse each of the ammonium salts into the clay slurry. The mixtures were stirred for 30 minutes at 65° C. cooled sheared for 10 seconds to break up agglomerates and analyzed for percent solids. Percent solids values for each of the above deinking agents were as follows: (a) 5.16%, (b) 5.40% (c) 6.14%, (d) 6.37% and (e) 7.19%.

EXAMPLE 9

This example delineates the water washing deinking procedure followed to evaluate the effectiveness of the deinking agents described in Example 8, and those of Examples 10-14 below, in deinking waste newsprint to yield recycled paper of enhanced brightness.

An amount of organoclay slurry containing 0.04 grams of organoclay solids was added to 375 milliliters of water heated to 50°-55° C. and adjusted to a pH of 9.5 with 1.0 milliliter of 10% sodium hydroxide solution. 4.0 grams of shredded newspaper was added to the bath and allowed to mix under low agitation for 10 minutes. The waste newspaper was then defibered by mixing for 3 minutes using a Cowles high speed dispersator at 2500 rpm. Next, the slurry was diluted with water to a volume of 1000 milliliters, and the pulp dewatered by draining on a 200 mesh sieve after a small amount of the foamy deinked floc floating on the surface was removed by aspiration. The pulp was stirred into 1000 milliliters of fresh water, and dewatered again by draining on a 200 mesh sieve; this procedure was then repeated one more time. The pulp was diluted with 1000 milliliters of water and vacuum filtered.

The resulting paper pulp mat was deposited onto a plastic sheet, covered with two filter paper blotters, onto which another plastic sheet was placed. The paper pulp was then subjected to a pressure of 1 ton in a press for 90 seconds. The pressed sheet was removed from the press; the filter paper blotters were removed and the pressed sheet was folded in half and allowed to air dry overnight. After drying, the pressed sheet was tested using a Hunterlab Model D-25 Optical Sensor to measure blue reflectance, which was employed as an indicator of paper brightness.

EXAMPLE 10

The water-dispersible organoclay deinking agents described in Example 8 were evaluated according to the water washing deinking procedure described in Example 9. Data are presented below.

| Sample | Brightness Value | Δ |
| --- | --- | --- |
| Blank - No Deinking Agent | 60.75 | — |
| Example 8(a) | 62.13 | +1.38 |
| Example 8(b) | 62.89 | +2.14 |
| Example 8(c) | 63.09 | +2.34 |
| Example 8(d) | 62.77 | +2.02 |
| Example 8(e) | 62.83 | +2.08 |

Data indicate that all organoclay deinking agents provided greater paper brightness than the Blank. Organoclays composed of 55 m.e. to 100 m.e. of octadecyl-methyl-[ethoxylated (15)] ammonium chloride provide similar levels of paper brightness. Organoclay deinking agents composed of less than 55 m.e. of the ammonium slat did not appear to function as effectively.

EXAMPLE 11

This example describes the preparation of a series of water-dispersible organoclay deinking agents composed of crude hectorite clay reacted with 70 m.e. of various types of ammonium salts in which (1) the number of moles of ethylene oxide and (2) the number of hydrogenated tallow chains, were varied.

283.0 grams of a 5.30% solids sheared crude hectorite clay slurry (15 grams of crude clay solids) was weighed into a 1.2 liter stainless steel reaction vessel, diluted with 120 milliliters of water and heated to 65° C. 70 milliequivalents of the following ethoxylated ammonium salts were heated and poured into charges of crude clay slurry: ( a ) 76.0% active dihydrogenated tallow-methyl-[ethoxylated (2)]ammonium chloride (8.39 g), (b) 76.5% active dihydrogenated tallow-methyl-[ethoxylated (7)]ammonium chloride (11.77 g), (c) 77.1% active dihydrogenated tallow-methyl-[ethoxylated (16) ]ammonium chloride ( 17.20 g), (d) 78.5% active dihydrogenated tallow-methyl-[ethoxylated (33)]ammonium chloride (26.93 g), (e) 75.4% active dihydrogenated tallow-methyl-[ethoxylated (50)]ammonium chloride (41.58 g) and (f) 75.1% active hydrogenated tallow-methyl-[ethoxylated (15) ]ammonium chloride ( 13.75 g).

Additionally, 291.3 grams of 5.15% solids sheared crude hectorite clay slurry (15 grams of crude clay solids) was weighed into a 1.2 liter stainless steel reaction vessel, diluted with 110 milliliters of water and heated to 65° C. 70 milliequivalents of the following ethoxylated ammonium salts were heated and poured into charges of crude clay slurry: (g) 75.8% active hydrogenated tallow-methyl-[ethoxylated (7)]ammonium chloride (8.57 g), (h) 75.3% active hydrogenated tallow-methyl-[ethoxylated (30)]ammonium chloride (22.72 g) and (i) 74.9% active hydrogenated tallow-methyl-[ethoxylated (50)]ammonium chloride (35.20 g). All organoclays were reacted for 30 minutes at 65° C., cooled, sheared for 10 seconds, and the percent solids of each sample determined.

EXAMPLE 12

The water-dispersible organoclay deinking agents prepared in Example 11 were evaluated according to the water washing deinking procedure described in Example 9. Data are presented below.

| Sample | Brightness Value | Δ |
|---|---|---|
| Blank - No Deinking Agent | 62.02 | — |
| Example 11(a) | 60.57 | −1.45 |
| Example 11(b) | 60.73 | −1.29 |
| Example 11(c) | 61.50 | −0.52 |
| Example 11(d) | 64.37 | +2.35 |
| Example 11(e) | 60.92 | −1.10 |
| Example 11(f) | 63.71 | +1.69 |
| Example 11(g) | 61.93 | −0.09 |
| Example 11(h) | 63.24 | +1.22 |
| Example 11(i) | 62.81 | +0.79 |

Data indicate an increased level of brightness for newspaper treated with organoclay water washing deinking agents composed of ammonium salts with one hydrogenated tallow chain and 15–50 moles of ethylene oxide. A significant increase in brightness was also obtained for organoclay water washing deinking agents composed of an ammonium salt with two hydrogenated tallow chains and 33 moles of ethylene oxide.

EXAMPLE 13

This example describes the preparation of a water-dispersible organoclay deinking agent according to the invention.

1388.9 grams of a 2.88% solids Manton-Gaulin sheared bentonitc clay slurry (40 grams clay solids) was weighed into a 3 liter stainless steel reaction vessel, diluted with 150 milliliters of water and heated to 65° C. 135 m.e. of 97% active octadecyl-methyl-[ethoxylated (15)]ammonium chloride (55.29 g) was heated and poured into the clay slurry. The organoclay was reacted 30 minutes at 65° C., cooled, and sheared for 10 seconds. The percent solids in the composition was determined.

EXAMPLE 14

The organoclay deinking agent prepared in Example 13 was evaluated according to the water washing deinking procedure described in Example 9. Data are presented below.

| Sample | Brightness Value | Δ |
|---|---|---|
| Example 13 | 53.51 | +1.62 |
| Blank | 51.89 | — |

This example demonstrates that enhanced paper brightness can be achieved when a waste newsprint is treated with a water-dispersible organoclay deinking agent based on the reaction product of cation-exchangeable clay and an ammonium salt.

EXAMPLE 15

The purpose of this example was to evaluate the effect an organoclay deinking composition has on sticky adhesive materials used on self sticking labels.

1.25 gram charges of self-sticking labels were cut into approximately one-inch squares and separately added to Samples 1 and 2 below:

Sample 1

125 grams of water, 0.25 grams of a 10% sodium hydroxide solution, and 9.4 grams of a deinking agent comprising a reaction product of 150 m.e. methyl trihydrogenated tallow ammonium chloride and bentonite clay (5.30% solids - 0.5 grams solids).

Sample 2

125 grams of water and 0.25 grams of a 10% sodium hydroxide solution (Blank).

The resulting slurries were mixed for 10 minutes at 1500–2000 r.p.m. using a Cowles dispersator. The following observations were made:

Sample (1) with organoclay eliminated the stickiness of the labels. Labels did not stick to each other, allowing easy disintegration of the paper labels.

Sample (2) (Blank) labels retained stickiness and stuck to each other, forming a single mass which was difficult to disintegrate.

The foregoing example demonstrates the ability of the compositions of this invention to eliminate the stickiness of tacky contaminants present in pulped wastepaper.

EXAMPLE 16

This example describes the preparation of a most preferred organoclay deinking composition according to the invention for use in a floatation deinking process, based on a reaction product of cation-exchangeable clay and an ammonium salt.

185.9 grams of a 10.76% solids crude hectorite clay slurry (20 grams of crude clay solids) sheared using a Tekmar SD-45 disperser was weighed into a 1.2 liter stainless steel reaction vessel, diluted with 75 milliliters of water and heated to 65° C. 85 milliequivalents (17.32 g) of 77.5% active methyl trihydrogenated tallow ammonium chloride was melted and poured into the clay slurry. 25 milliliters of hot water was employed to rinse the ammonium salt into the clay slurry. The resulting mixture was stirred for 30 minutes at 65° C. cooled, sheared for 15 seconds to break up agglomerates and analyzed for percent solids. Percent solids was found to equal 14.37%.

EXAMPLE 17

This example describes the floatation deinking procedure followed for evaluating the effectiveness of the deinking agent prepared in Example 16 in deinking waste newsprint to yield recycled paper of enhanced brightness.

A portion of the organoclay slurry deinking agent prepared in Example 16 containing 0.5 grams of organoclay solids was added to 500 milliliters of water heated to 45° C. and adjusted to a pH of 9.5 with 1.0 milliliter of 10% sodium hydroxide solution. 5.6 grams of newspaper (Trentonian), cut into small (∼½ square inch) pieces, was added to the aqueous slurry and allowed to mix under low agitation for 10 minutes. The waste newspaper was then defibered by mixing for 3 minutes using a Cowles high speed dispersator at 2500 r.p.m. The defibered newspaper/organoclay mixture was then subjected to air sparging in order to float the flocculated ink waste. A floating ink floc was produced; it was removed by suction.

After air sparging and removal of the floated floc for a period of 15 minutes, the deinked paper pulp was recovered and acidified to a pH of 4.5 with sulfuric acid. The deinked paper pulp was then vacuum filtered and deposited onto a plastic sheet, covered with two filter paper blotters, onto which another plastic sheet was placed. The paper pulp was subjected to a pressure of 1 ton in a press for 90 seconds. The pressed sheet was removed from the press; the filter paper blotters were removed, and the pressed sheet was allowed to air dry overnight. After drying, the pressed sheet was tested using a Hunterlab Model D-25 Optical Sensor to measure blue reflectance, which was employed as an indicator of paper brightness.

For comparison, a Blank was also run. For the Blank, the procedure described above was followed, except that no organoclay deinking agent was added. Data are presented below.

| Sample | Brightness Value | Δ |
|---|---|---|
| Blank - No Deinking Agent | 51.40 | — |
| Example 16 | 57.06 | 5.66 |

Data indicate greater recycled paper brightness compared to the Blank for organoclay deinking agents of this invention employed in a floatation deinking process.

EXAMPLE 18

The following example illustrates the formation of an organoclay deinking agent in situ in an aqueous system, and the deinking of different types of wastepaper using the in situ formed organoclay in comparison with other deinking agents.

A preformed organoclay made using crude hectorite and an ammonium salt (methyl trihydrogenated tallow ammonium chloride - M3HT), additional M3HT, and crude hectorite clay were separately employed as deinking agents in a floatation deinking process. Since the preformed organoclay was composed of approximately 50% ammonium salt and 50% crude hectorite clay, the methyl trihydrogenated tallow ammonium chloride and crude hectorite were each separately employed at a loading that was 50% of the preformed organoclay loading. Each of these agents was employed in conjunction with 0.0225 g of Brij 700 surfactant.

For comparison, floatation deinking tests employing (1) no deinking agent (Blank) and (2) 1% oleic acid/2% Ca(OH)2 (fatty acid soap control) were also run.

Wastepaper mixes employed in the experiments of this example included (1) 100% oil-based ink printed news; (2) 100% flexographic (water-based inks) printed news; (3) 35%/35%/30% flexographic printed news/oil-based printed news/magazine; and (4) 70%/30% flexographic printed news/magazine. The waste newspapers contained very low levels of ash ($\approx 0.7\%$ or less) and thus carried very little clay. In contrast, the magazine paper had an ash content of approximately 24%.

In the deinking tests, wastepaper was pulped at a 4% concentration in warm water containing 0.16% diethylenetriaminepentaacetic acid, 3% sodium silicate solution, 1% sodium hydroxide, 1%-hydrogen peroxide, and the deinking agent (percentages based on paper weight). Paper was pulped for 10 minutes in a Maelstrom laboratory pulper. After pulping, the paper was diluted to 1% with warm water, transferred to a 5 liter laboratory floatation cell and subjected to air floatation. Suction techniques were employed to remove floated waste ink from the pulp surface.

Pulp samples were taken at 0, 9, and 18 minutes into the floatation step. Pulp samples were acidified to pH 4.5, filtered, pressed, dried, and the blue reflectance of the test sheet measured using a Hunterlab device. Blue reflectance values were employed as a measure of paper brightness. Brightness pads taken at 0 and 18 minutes were additionally evaluated for ash content. Data are presented in Tables I and II.

Data presented in Table I indicate that for wastepaper composed of 100% newsprint, only the preformed organoclay was able to effectively collect and float the waste ink. Neither the ammonium salt alone (methyl trihydrogenated tallow ammonium chloride) nor the crude hectorite clay improved recycled newsprint brightness over that obtained for the Blank. For wastepaper composed of a mixture of newsprint and magazine, however, both the preformed organoclay and the methyl trihydrogenated tallow ammonium chloride provided effective ink collection and removal. The ammonium salt (methyl trihydrogenated tallow ammonium chloride) functioned by reacting with clay released from the magazine paper on pulping to form organoclay in situ, which served as a successful ink collector.

As shown in Table II, floatation deinking employing the preformed organoclay and methyl trihydrogenated tallow ammonium chloride additives resulted in large reductions in pulp ash content on floatation for wastepaper composed of a newsprint/magazine mix. Ash consists primarily of clay which is introduced to the pulp mostly from the coated magazine paper. The reduction in ash content therefore further supports the fact that organoclay formed in situ in the aqueous system is responsible for collection of the waste ink.

TABLE I

| Deinking Agent | Wastepaper | Brightness Values (Front/Back) | | |
|---|---|---|---|---|
| | | 0 Min. | 9 Min. | 18 Min. |
| Blank | Oil News | 57.1/55.4 | 59.3/57.5 | 59.2/57.8 |
| A | Oil News | 42.9/44.0 | 53.2/52.9 | 56.5/56.6 |
| B | Oil News | 49.9/46.4 | 50.6/47.1 | 49.7/47.1 |
| C | Oil News | 50.7/52.3 | 64.0/63.6 | 66.2/66.1 |
| Blank | Flexo News | 47.8/31.5 | 51.4/32.1 | 49.1/31.1 |
| D | Flexo News | 37.1/37.4 | 47.5/47.3 | 50.9/50.4 |
| E | Flexo News | 49.2/28.1 | 47.8/27.0 | 50.7/27.5 |
| F | Flexo News | 38.2/39.0 | 56.5/56.9 | 60.1/59.7 |
| Blank | 35/35/30 | 52.2/44.2 | 55.7/44.8 | 56.7/45.6 |
| A | 35/35/30 | 43.7/47.3 | 63.0/63.2 | 64.2/64.4 |
| B | 35/35/30 | 46.9/39.9 | 47.9/40.6 | 47.9/42.4 |
| C | 35/35/30 | 43.9/46.2 | 61.3/60.0 | 62.7/61.9 |
| G | 35/35/30 | 46.6/41.9 | 52.7/45.8 | 54.3/46.8 |
| A | 70/30 | 41.2/40.6 | 55.9/54.0 | 57.8/56.2 |
| C | 70/30 | 40.4/41.8 | 51.7/52.1 | 55.3/54.6 |
| G | 70/30 | 43.0/36.3 | 48.0/38.5 | 47.0/37.9 |

TABLE II

| Deinking Agent | Wastepaper | Ash Content | |
|---|---|---|---|
| | | 0 Min. | 18 Min. |
| Blank | Oil News | 0.72 | 0.71 |
| A | Oil News | 0.47 | 0.19 |
| B | Oil News | 2.68 | 2.49 |
| C | Oil News | 2.18 | 0.36 |
| Blank | Flexo News | 0.48 | 0.42 |
| D | Flexo News | 0.49 | 0.35 |
| E | Flexo News | 2.72 | 2.38 |
| F | Flexo News | 3.15 | 0.54 |
| Blank | 35/35/30 | 6.39 | 5.39 |
| A | 35/35/30 | 8.19 | 1.42 |
| B | 35/35/30 | 8.79 | 8.07 |
| C | 35/35/30 | 8.69 | 1.26 |

TABLE II-continued

| Deinking Agent | Wastepaper | Ash Content | |
|---|---|---|---|
| | | 0 Min. | 18 Min. |
| A | 70/30 | 6.74 | 1.06 | wherein:
A = 1.5% methyl trihydrogenated tallow ammonium chloride with 0.0225 g Brij 700 surfactant
B = 1.5% crude hectorite with 0.0225 g Brij 700 surfactant
C = 3.0% preformed organoclay
D = 3.0% methyl trihydrogenated tallow ammonium chloride with 0.0225 g Brij 700 surfactant
E = 3.0% crude hectorite with 0.0225 g Brij 700 surfactant
F = 6.0% preformed organoclay
G = 1.0% oleic acid with 2.0% Ca(OH)$_2$

EXAMPLE 19

The following example illustrates the in situ formation of several preferred organoclay deinking agents in an aqueous system, and the floatation deinking of wastepaper using the in situ formed organoclay compositions.

Ammonium salts included methyl trihydrogenated tallow ammonium chloride (M3HT), dimethyl dihydrogenated tallow ammonium chloride (2M2HT), dimethyl dicoco ammonium chloride (2M2COCO), benzyl methyl dlhydrogenated tallow ammonium chloride (BM2HT), dlhydrqenated tallow-methyl [ethoxylated(2) ]ammonium chloride (H2HT-2 E.O. ), and dihydroxyethyltsoarchtdaloxypropyl amonium chloride (TOMAH Q-24-2). M3HT, 2M2HT, 2M2COCO and BM2HT were employed in conjunction with 0.02259 of BrlJ 100 surfactant (4,5% of the ammonium malt weight). The wastepaper mix employed in the experiments of this example was composed of 35%/35%/30% flexographic (water-based) printed news/oil-based ink printed news/magazine.

In the deinking tests, wastepaper was pulped at a 4% concentration in wan water containing 0.16% diethylene-triaminepentaacetic acid, 3% sodium silicate solution, 1% sodium hydroxide, 1% hydrogen peroxide, and the deinking agent (percentages based on weight). Paper was pulped for 10 paper was diluted to 1% with van water, transferred to a 5 liter laboratory floatation cell and subjected to air floatation. Suction techniques were employed to remove floated waste ink from the pulp surface.

Pulp samples were taken at 0, 9, and 18 minutes into the floatation step. Pulp samples were acidified to pH 4.5, filtered, pressed, dried, and the blue reflectance of the test sheet measured using a Hunterlab device. Blue reflectance values were employed as a measure of paper brightness. Data are presented in Table III.

Data indicate that the six preferred ammonium salts provide effective ink collection and removal when employed versus wastepaper composed of the 35/35/30 mix. The ammonium salts functioned by reacting with clay released from the magazine paper on pulping to form organoclay in situ, which served as a successful ink collector.

TABLE III

| Deinking Agent | Wastepaper | Brightness Values (Front/Back) | | |
|---|---|---|---|---|
| | | 0 Min. | 9 Min. | 18 Min. |
| H | 35/35/30 | 45.3/42.4 | 59.1/55.2 | 61.9/54.0 |
| I | 35/35/30 | 45.2/43.5 | 60.5/56.0 | 64.2/61.9 |
| J | 35/35/30 | 48.1/42.9 | 61.5/59.2 | 63.7/62.7 |
| K | 35/35/30 | 48.8/45.3 | 61.3/60.5 | 64.1/60.8 |
| O | 35/35/30 | 47.9/45.4 | 59.2/55.1 | 61.6/57.4 |

TABLE III-continued

| Deinking Agent | Wastepaper | Brightness Values (Front/Back) | | |
|---|---|---|---|---|
| | | 0 Min. | 9 Min. | 18 Min. |
| P | 35/35/30 | 48.5/41.4 | 61.2/56.6 | 62.8/61.2 | wherein:
H = 1.0% M3HT with 0.0225 g Brij 700
I = 1.0% 2M2HT with 0.0225 g Brij 700
J = 1.0% BM2HT with 0.0225 g Brij 700
K = 1.0% M2HT-2 E.O.
O = 1.0% TOMAH Q-24-2 E.O.
P = 1.0% 2M2COCO with 0.0225 g Brij 700

EXAMPLE 20

The following example illustrates the in situ formation of cation-exchangeable clay based organoclay deinking agents in an aqueous system, and the floatation deinking of wastepaper using the in situ formed organoclays in comparison with other deinking agents.

The cation-exchangeable clays included 6-Tile kaolin clay and Opacitex, a kaolin-based calcined opacifier. The ammonium salt employed was methyl trihydrogenated tallow ammonium chloride. M3HT quaternary ammonium salt was employed in conjunction with 0.0225 g of Brij 700 surfactant. The wastepaper mix used in the experiments of this example was composed of 35%/65% flexographic printed news/oil-based printed news. Ash content of the wastepaper was about 0.7%.

In the deinking tests, wastepaper was pulped at a 4% concentration in warm water containing 0.16% diethylene-triaminepentaacetic acid, 3% sodium silicate solution, 1% sodium hydroxide, 1% hydrogen peroxide, and the deinking agent (percentages based on paper weight). Paper was pulped for 10 minutes in a Maelstrom laboratory pulper. After pulping, the paper was diluted to 1% with warm water, transferred to a 5 liter laboratory floatation cell, and subjected to air floatation. Suction techniques were employed to remove floated waste ink from the pulp surface.

Pulp samples were taken at 0, 9, and 18 minutes into the floatation step. Pulp samples were acidified to pH 4.5, filtered, pressed, dried, and the blue reflectance of the test sheet measured using a Hunterlab device. Blue reflectance values were employed as a measure of paper brightness. Data are presented in Table IV.

Data obtained versus wastepaper composed of 100% newsprint indicate that in situ generated organoclays, based on kaolin or calcined kaolin clays, yield significantly improved floatation deinking performance compared to that obtained for either the Blank or the ammonium salt alone. Thus, the in situ generated organoclay deinking additives of this invention may be based on a variety of cation-exchangeable clays.

TABLE IV

| Deinking Agent | Wastepaper | Brightness Values (Front/Back) | | |
|---|---|---|---|---|
| | | 0 Min. | 9 Min. | 18 Min. |
| Blank | 35/65 | 54.3/34.7 | 51.9/32.0 | 56.1/41.3 |
| L | 35/65 | 42.7/41.3 | 50.0/49.7 | 53.6/52.9 |
| M | 35/65 | 43.5/41.1 | 55.7/55.6 | 57.6/56.7 |
| N | 35/65 | 44.4/43.9 | 58.1/56.8 | 60.8/59.2 | wherein:
L = 1.5% M3HT with 0.0225 g Brij 700
M = 1.5% M3HT + 1.5% 6-Tile kaolin clay with 0.0225 g Brij 700
N = 1.5% M3HT + 1.5% Opacitex calcined kaolin clay with 0.0225 g Brij 700

EXAMPLE 21

The following example illustrates the in situ formation of several organoclay deinking agents, based on different cation-exchangeable clays, in an aqueous system, and the flocculation and collection of flexographic (water-based) ink using the in situ formed organoclay compositions.

The ammonium salt employed in this example was dimethyl dihydrogenated tallow ammonium chloride (2M2HT). The cationexchangeable clays included crude hectorite clay (cation exchange capacity =55 m.e./100 grams), saponite (cation exchange capacity =67 m.e./100 grams), attapulgite (cation exchange capacity- 24 m.e./100 grams), and kaolinite ( cation exchange capacity =13 m.e./100 grams).

In the test, 100 grams of water, containing 0.025 g of dark blue water-based ink and adjusted to pH 9.0 using sodium hydroxide, was transferred to a 4 ounce bottle. Next, 0.17 g of 85.5% active 2M2HT was added and the bottle placed in a hot water bath to increase the temperature to about 50°-55° C. A total of five of the above-described dark blue water-based ink solutions containing 2M2HT were prepared. It was noted that addition of the 2M2HT did not alter the ink solution, i.e., no flocculation of the ink occurred.

Four of the five ink/2M2HT solutions were treated separately With addition of (1) 0.04 g crude hectorite, (2) 0.1 g saponite, ( 3 ) 0.1 g attapulgite and ( 4 ) 0.22 g kaolinite. The bottles were capped, shaken, allowed to sit for five minutes, and observations recorded. The ink solution containing only 2M2HT was dark blue in color with no flocculation of ink. In contrast, all four of the ink/2M2HT solutions in which cation-exchangeable clay was introduced contained dark blue organoclay/ink flocs which mostly floated on the surface leaving either a clear or very slightly colored water phase. Thus, this example again demonstrates that the flocculation and collection of waste ink is not accomplished by ammonium salt alone, but rather by organoclay which can be formed in situ.

EXAMPLE 22

The following example illustrates the deinking performance obtained for several preformed organoclays compared to that obtained when the same levels of cation exchangeable clay and ammonium salt, as are contained in the preformed organoclay, are added separately to the aqueous system to form organoclay in situ.

Two preformed organoclays were prepared as follows. 385.6g of a 7.78% solids crude hectorite clay slurry (30g crude clay solids) was weighed into a 1.2 liter stainless steel reaction vessel and heated to 65° C. 120 milliequivalents of the following quats were melted and poured into the clay slurry (1) 87.5% active 2M2HT (23.87g) and (2) 80.86% active M3HT (35.17g). 50 mls of hot water was employed to rinse the ammonium salt into the clay slurry. The resulting mixtures were stirred for 30 minutes at 65° C., cooled and analyzed for percent solids. Percent solids obtained were as follows (1) 11.24% and (2) 12.63%.

The two preformed organoclays were employed as floatation deinking agents at a 2% loading (percentage based on paper weight) versus 50g of wastepaper composed of 35%/35%/30% flexo printed news/oil printed news/magazine. For comparison, two in situ generated organoclays composed of (1) 2M2HT employed separately with crude hectorite clay and (2) M3HT employed separately with crude hectorite clay were also evaluated versus 50g of the same 35%/35%/30% wastepaper mix. The amount of quat and crude clay employed separately in each case was equivalent to the amount of each component contained in the 2% loading of preformed organoclay.

In the deinking tests, wastepaper was pulped at a 4% concentration in warm water containing 0.16% diethylenetriaminepentacetic acid, 3% sodium silicate solution, 1% sodium hydroxide, 1% hydrogen peroxide and the deinking agent (percentages based on weight). In each test, 0.015g of Brij 700 was also added to enhance foaming and floatation properties. Paper was pulped for 10 minutes in a Maelstrom laboratory pulper. After pulping, the paper was diluted to 1% consistency with warm water, transferred to a 5 liter laboratory floatation cell and subjected to air floatation. Suction techniques were employed to remove floated waste ink from the pulp surface.

Pulp samples were taken at 0, 9 and 18 minutes into the floatation step. Pulp samples were acidified to pH 4.5, filtered, pressed, dried and the blue reflectance of the test sheet measured using a Hunterlab device. Blue reflectance values were employed as a measure of paper brightness. Data are presented in Table V.

TABLE V

| DEINKING AGENT | BRIGHTNESS VALUES (FRONT/BACK) | | |
|---|---|---|---|
| | 0 MIN. | 9 MIN. | 18 MIN. |
| Q | 41.5/39.4 | 49.8/44.2 | 52.2/47.4 |
| R | 41.3/39.5 | 50.6/42.6 | 51.2/44.4 |
| S | 38.6/36.4 | 42.9/42.1 | 47.7/41.5 |
| T | 40.5/40.7 | 50.6/44.0 | 50.8/50.3 |

Wherein:
Q = 2% M3HT/crude hectorite preformed organoclay 7.92 g of 12.63% solids slurry → 1.0 g organoclay with 0.015 g of Brij 700.
R = Separate addition of 6.60 g of 7.78% solids crude hectorite clay to yield 0.5133 g solids and 0.602 g of 80.86% active M3HT to yield 0.4867 g solids with 0.015 g of Brij 700.
S = 2% 2M2HT/crude hectorite preformed organoclay 8.90 g of 11.24% solids slurry → 1.0 g organoclay with 0.015 g Brij 700.
T = Separate addition of 7.58 g of 7.78% solids crude hectorite clay to yield 0.5896 g solids and 0.469 g of 87.5% active 2M2HT to yield 0.4104 g solids with 0.015 g Brij 700.

Data indicate that adding the M3HT quat and crude hectorite separately to form the organoclay in situ provides a similar level of deinked paper brightness as that obtained for the preformed organoclay composed of M3HT/crude hectorite clay. Adding 2M2HT and crude hectoite separately to form the organoclay in situ provides greater deinked paper brightness and a cleaner pulp filtrate compared to that obtained for the preformed organoclay composed of 2M2HT/crude hectorite clay.

There is sufficient shear in the pulping cell to disperse preformed M3HT organoclay so that no significant increase in performance results from employing M3HT and cation exchangeable clay as separate addition; for a harder to disperse 2M2HT organoclay, however, a significant increase in performance results from in situ formation.

The invention thus being described, it will be obvious that the same may be varied in many ways. Such variations are not to be regarded as a departure from the spirit and scope of the invention and all such modifications are intended to be included within the scope of the claims.

What is claimed is:

1. A process for deinking wastepaper, which comprises:

(a) forming an organoclay deinking agent in a waste paper containing aqueous system by reacting one or more cation exchangeable clays having a cation exchange capacity of at least 5 millequivalants per 100 grams of clay with one or more ammonium slats;

(b) contacting ink from wastepaper in the aqueous system with an amount of the organoclay deinking agent effective to deink the wastepaper; and (c) recovering deinked paper pulp from the aqueous system.

2. The process of claim 1, wherein the organoclay deinking agent is formed in said aqueous system by adding one or more of said ammonium salts and one or more of said cation-exchangeable clays to the aqueous system.

3. The process of claim 1, wherein the organoclay deinking agent is formed in said aqueous system by pulping wastepaper containing one or more of said cation-exchangeable clays; and (b) mixing at least one of said ammonium salts with the aqueous system to form an organoclay deinking agent.

4. The process of claim 1 wherein the organoclay deinking agent is formed in said aqueous system by adding an anhydrous blend consisting of one or more of said cation-exchangeable clays and one or more of said ammonium salts.

5. The process of claim 1, wherein the organoclay deinking agent is formed in said aqueous system by (a) pulping wastepaper containing at least one of said ammonium slats; and (b) mixing one or more of said cation-exchangeable clays with the aqueous system to form an organoclay deinking agent.

6. The process of claim 1, wherein the organoclay deinking agent is present in an amount of from about 0.05% to about 50% by weight, based on the dry weight of the wastepaper.

7. The process of claim 1, wherein the wastepaper is selected from the group consisting of newspaper, magazines, computer paper, legal documents, book stock, and mixtures thereof.

8. The process of claim 1, wherein the ink comprises a water-based ink.

9. The process of claim 1, wherein the ink comprises an oil-based ink.

10. The process of claim 1, wherein the recovering step includes air sparging in order to float ink removed from the wastepaper to the surface of said aqueous system.

11. The process of claim 1, wherein the organoclay deinking agent comprises a reaction product of:
(a) said one or more cation-exchangeable clays; and
(b) said one or more ammonium salts in an amount of from about 20% to about 350% of the cation exchange capacity of said one or more cation-exchangeable clays.

12. The process of claim 1, wherein said aqueous system further comprises a polyoxyethylene surfactant.

13. The process of claim 1, wherein the organoclay deinking agent comprises a mixture of at least one hydrophobic organoclay with at least one hydrophilic organoclay.

14. The process of claim 1, wherein the organoclay deinking agent comprises a reaction product of (a) a mixture of at least two different of said cation-exchangeable clays; and (b) one or more ammonium salts.

15. The process of claim 1, wherein the organoclay deinking agent comprises a reaction product of (a) at least one said cation-exchangeable clays; and (b) one or more of said ammonium salts, which have both hydrophobic and hydrophilic groups.

16. The process of claim 1, wherein the recovery step includes floatation of ink removed from the wastepaper to the surface of the aqueous system.

17. The process of claim 1, wherein the organoclay deinking agent comprises a reaction product of:
(a) said one or more cation-exchangeable clays; and
(b) wherein said one or more ammonium salts comprise:
(i) at least one hydrocarbon chain having from about 8 to about 30 carbon atoms; and
(ii) either no hydrophilic carbon chain or a hydrophilic carbon chain having a total of about 9 moles of ethylene oxide or less.

18. The process of claim 1, wherein the organoclay deinking agent comprises a reaction product of crude hectorite clay having a cation exchange capacity of at least 5 millequivalents per 100 grams of clay and methyl trihydrogenated tallow ammonium chloride.

19. The process of claim 1, wherein the recovery step includes water washing the deinked paper pulp.

20. The process of claim 1, wherein the organoclay deinking agent comprises a reaction product of:
(a) said one or more cation-exchangeable clays; and
(b) said one or more ammonium salts which comprise:
(i) at least one hydrocarbon chain having from about 8 to about 30 carbon atoms; and
(ii) at least one hydrophilic carbon chain having greater than about 9 moles of ethylene oxide.

21. The process of claim 1, wherein the organoclay deinking agent comprises a reaction product of crude hectorite clay having a cation exchange capacity of at least 5 millequivalents per 100 grams of clay and octadecyl-methyl-ethoxylated (15) ammonium chloride.

22. The process of claim 1, wherein the organoclay deinking agent comprises a reaction product of methyl trihydrogenated tallow ammonium chloride and one or more of said cation-exchangeable clays.

23. The process of claim 1, wherein the organoclay deinking agent comprises a reaction product of dimethyl dihydrogenated tallow ammonium chloride and one or more of said cation-exchangeable clays.

24. The process of claim 1, wherein the organoclay deinking agent comprises a reaction product of dimethyl dicoco ammonium chloride and one or more of said cation-exchangeable clays.

25. The process of claim 1, wherein the organoclay deinking agent comprises a reaction product of benzyl methyl dihydrogenated tallow ammonium chloride and one or more of said cation-exchangeable clays.

26. The process of claim 1, wherein the organoclay deinking agent comprises a reaction product of dihydrogenated tallow-methyl ethoxylated(2) ammonium chloride and one or more of said cation-exchangeable clays.

27. The process of claim 1, wherein the organoclay deinking agent comprises a reaction product of dihydroxyethylisoarchidaloxypropyl ammonium chloride and one or more of said cation-exchangeable clays.

28. The process of claim 1, wherein the organoclay deinking agent is a reaction product of (a) one or more of said cation-exchangeable clays selected from the group consisting of crude hectoritc, crude bentonitc, beneficiated hectorire, beneficiated bentonire, spray dried hectorire, kaolinire, saponite, attapulgite, and mixtures thereof; and (b) one or more of said ammonium salts.

29. The process of claim 1, wherein the organoclay deinking agent is a reaction product of (a) one or more of said cation-exchangeable clays; and (b) wherein one or more of said ammonium salts have the formula:

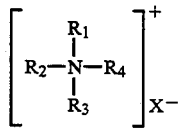

wherein $R_1$ comprises a lineal or branched aliphatic hydrocarbon group having from 1 to about 30 carbon atoms; $R_2$, $R_3$ and $R_4$ are independently selected from the group consisting of (a) lineal or branched aliphatic groups having from 1 to about 30 carbon atoms; (b) aromatic and substituted aromatic groups; (c) ethoxylated groups containing from 1 to about 80 moles of ethylene oxide; and (d) hydrogen.

30. A process for deinking wastepaper, which comprises:
    (a) forming an organoclay deinking agent in a waste paper containing aqueous system by adding one or more ammonium salts and one or more cation-exchangeable clays having a cation-exchange capacity of at least 5 millequivilants per 100 grams of clay to said aqueous system, and reacting said one more salts with said one or more clays to form said oganoclay deinking agent;
    (b) contacting ink from wastepaper in said aqueous system in the presence of a surfactant with an amount of the organoclay deinking agent effective to deink the wastepaper; and
    (c) recovering deinked paper pulp from said aqueous system.

31. The process of claim 30, wherein the ink comprises a water-based ink.

32. A process for deinking wastepaper, which comprises:
    (a) pulping wastepaper containing one or more cation-exchangeable clays having a cation exchange capacity of at lest 5 millequivilants per 100 grams of clay in a waste paper containing aqueous system, to releast said cation-exchangeable clay or clays from the wastepaper;
    (b) mixing at least one ammonium salt with said aqueous system and reacting with said salt said released clay to form an organoclay deinking agent, and contacting ink from the pulped wastepaper in said aqueous system in the presence of a surfactant with an amount of the organoclay deinking agent effective to deink the pulped wastepaper; and
    (c) recovering deinked paper pulp from said aqueous system.

33. The process of claim 32, wherein the ink comprises a water-based ink.

34. A process for deinking wastepaper, which comprises:
    (a) forming an organoclay deinking agent in a waste paper containing aqueous system by pulping wastepaper containing one or more ammonium salts and one or more cation-exchangeable clays having a cation exchange capacity of at least 5 millequivilants per 100 grams of clay, and reacting said one or more salts with said one or more clays to form said organoclay deinking agent;
    (b) contacting ink from wastepaper in said aqueous system in the presence of a surfactant with an amount of the organoclay deinking agent effective to deink the wastepaper; and
    (c) recovering deinked paper pulp from said aqueous system.

35. The process of claim 34, wherein the ink comprises a water-based ink.

36. A process for deinking wastepaper, which comprises:
    (a) pulping wastepaper containing at least one ammonium salt in an aqueous system to release at least one ammonium salt from the wastepaper;
    (b) mixing one or more cation-exchangeable clays having a cation exchange capacity of at least 5 milliequivalents per 100 grams of clay with the waste paper containing aqueous system and reacting with said one or more clays said released salt to form an organoclay deinking agent, and contacting ink from the pulped wastepaper in said aqueous system in the presence of a surfactant with an amount of the organoclay deinking agent effective to deink the pulped wastepaper; and
    (c) recovering deinked paper pulp from said aqueous system.

37. The process of claim 36, wherein the ink comprises a water-based ink.

38. A process for deinking wastepaper, which comprises:
    (a) forming an organoclay deinking agent in a waste paper containing aqueous system, wherein the organoclay deinking agent comprises a reaction product of an cation-exchangeable clay having a cation exchange capacity of at least 5 milliequivalents per 100 grams of clay and dimethyl dihydrogenated tallow ammonium chloride;
    (b) contacting a water-based ink from wastepaper in said aqueous system with an amount of the organoclay deinking agent effective to deink the wastepaper; and
    (c) recovering deinked paper pulp from said aqueous system.

* * * * *